Sept. 14, 1965  J. W. MOHLAN ETAL  3,205,672

HEATED WEIR IN A REFRIGERATION TANK

Filed Aug. 29, 1962

INVENTORS
JOHN W. MOHLMAN
EDWARD L. GHORMLEY
BY
ATTORNEY

United States Patent Office 3,205,672
Patented Sept. 14, 1965

3,205,672
HEATED WEIR IN A REFRIGERATION TANK
John W. Mohlan, Tarzana, and Edward L. Ghormley, Northridge, Calif., assignors, by mesne assignments, to Struthers Scientific and International Corporation
Filed Aug. 29, 1962, Ser. No. 220,201
4 Claims. (Cl. 62—58)

This invention relates generally to refrigeration and more particularly to improvements in apparatus and processes for freeze congealing a solution to form floatable solids and a more concentrated residual liquor.

The invention is especially well suited for use in freeze demineralization processes for conversion of sea water and brackish and waste waters to potable water, and, accordingly, a freeze desalting process for conversion of sea water has been chosen as an illustrative case for reference in describing this invention.

Conventional freeze desalting processes comprise the operations of partially freezing sea water by direct-contact with an evaporative refrigerant, e.g., butane; separating the ice crystals from the brine; melting the separated ice as by direct-contact with vapors of the refrigerant which condense and are returned to the freezer, and withdrawing product water from the melter. Recent developments in such processes, as disclosed in application for U.S. Letters Patent, Serial No. 668,284, filed June 25, 1957, include the use of an additional liquid, e.g., gasoline or octane, for liquid-liquid heat transfer purposes to conserve refrigeration by a cycle of operations in which a portion of the heat transfer liquid is passed through a product-water contactor and another portion through a brine contactor to cool the heat transfer liquid, and then the two cold streams are passed to a sea water pre-cooling contactor.

In the freezer for a continuous process, the chilled sea water flows through a crystallization zone where it is cooled by direct-contact with the refrigerant to a temperature at which ice crystals form, and a slurry of crystals in residual brine flows from the crystallization zone over a weir for transfer to the ice-brine separation and ice melting operations. By this invention the weir is provided with means for heating its overflow lip or edge to prevent adherence of ice crystals along the lip and to prevent accumulation and growth of large chunks of ice crystals on the upstream side of the weir.

Commercial success of a refrigeration sea water conversion process is dependent upon obtaining optimum heat exchange efficiencies between sea water, product water and brine, on the one hand, and the hydrocarbon heat-exchange mediums, i.e. refrigerant and the heat transfer liquid, on the other hand. This invention provides means and method for heating the overflow edge of the weir in the freezer with one of the hydrocarbon heat-exchange mediums, preferably the heat transfer liquid, e.g., octane, and for conducting the chilled medium to another operation in the process to recoup its refrigeration.

It is a general object of this invention to provide a refrigeration tank for congealing a solution to a slurry of floatable crystals in residual liquor, the tank having a weir which divides the tank into a crystallization chamber on the upstream side of the weir for formation of the crystals, and a collection chamber on the downstream side of the weir for receiving the slurry, and means for heating the weir to prevent adherence and accumulation of crystals at its overflow edge.

Another object is to provide a congealer of the above-mentioned character connected in a refrigeration system for conversion of a solution to a purer solid and a residual more concentrated liquor by heat exchange operations with a water-immiscible medium, the medium being employed in a cycle including passage of a warm portion of the medium through the weir of the congealer and flow from the weir to another operation in the system for increasing the efficiency of the system.

Further objects and advantages will appear in the following part of this specification wherein the details of construction and mode of operation of a preferred embodiment of the invention are described with reference to the accompanying drawing, in which.

Figure 1:
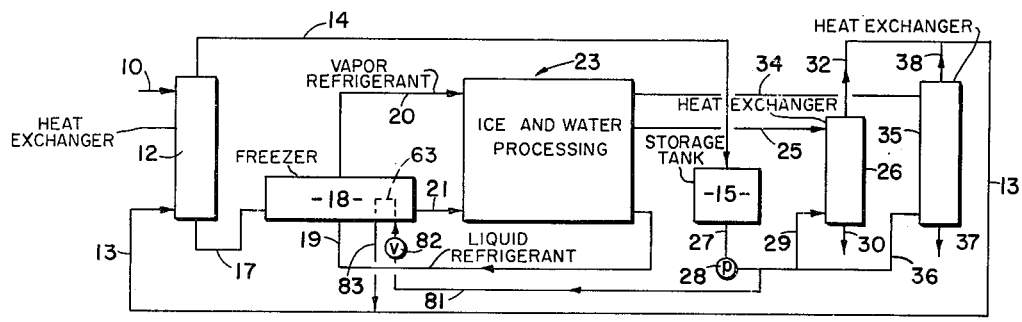
FIG. 1 is a schematic diagram of a sea water conversion plant including a refrigeration congealer embodying this invention.

Referring particularly to FIG. 1, which illustrates a system embodying the invention, the solution to be treated, e.g., sea water, enters the system through a line 10 passing into a heat exchanger 12, here a liquid-liquid contactor for counterflow direct-contact with a chilled hydrocarbon heat-exchange medium, e.g., octane, which is admitted to the contactor 12 via pipe line 13. The separated oil in the upper end of the contactor is withdrawn through a line 14 and emptied into a warm oil storage tank 15. The chilled settled sea water in the contactor is withdrawn from the bottom of the contactor through a line 17 and admitted to a refrigeration congealer or freezer 18.

An evaporative refrigerant, e.g., liquid butane, is admitted to the freezer 18 via a line 19. As the butane bubbles up through the body of sea water in the freezer, it flashes, thereby further chilling the sea water sufficiently to cause formation of ice crystals. The butane vapors are withdrawn through a duct 20 and a slushy ice-brine mixture or slurry is withdrawn from the freezer through a line 21.

The large square in the center of FIG. 1, designated generally by reference numeral 23, represents a plurality of conventional operations following the freezing operation in a freeze process for demineralizing sea water, i.e., the operations of separating the ice crystals in a pack from the brine of the slurry from the freezer, washing remaining brine from the ice pack as with product water; compressing the butane vapors from the freezer; melting the ice pack by contact directly with compressed butane vapors which condense on the ice crystals of the pack, and decanting the liquid butane from product water, the cycle of the butane in the process being completed by its return to the freezer through the line 19.

The cold product water from the operations represented collectively by square 23 is passed via a line 25 to a liquid-liquid contactor 26 for heat-exchange with warm oil from the storage tank 15. The drawoff line from the storage tank is designated by numeral 27 and includes a pump 28. A branch line 29 from the drawoff line 27 admits the warm oil to the lower end portion of the contactor 26. Settled product water is withdrawn from the bottom of the contactor 26 via line 30 and the cooled octane is withdrawn from the top of the contactor via line 32 connected to the octane inlet line 13 to the pre-cooler contactor 12. Similarly, the residual liquor, brine, is withdrawn from the operations of square 23 via a line 34 and passed to a liquid-liquid contactor 35 for counterflow heat-exchange with octane from the storage tank 15 and admitted to the contactor 35 via line 36 which branches from the warm oil drawoff line 27. Settled brine product is withdrawn from the bottom of the contactor 33 by a line 37 and cooled octane is withdrawn from the top of the contactor 35 via a line 38 to join with the cold oil stream from the product water contactor 26 for flow through line 13 to the pre-cooler heat exchanger 12. Thus, the cold brine from the washer in square 23 and the cold product water from the melter in square 23 give up their refrigeration by direct-contact with the heat exchange medium, octane, in the cycle of the heat transfer operations for the octane.

Figure 2:
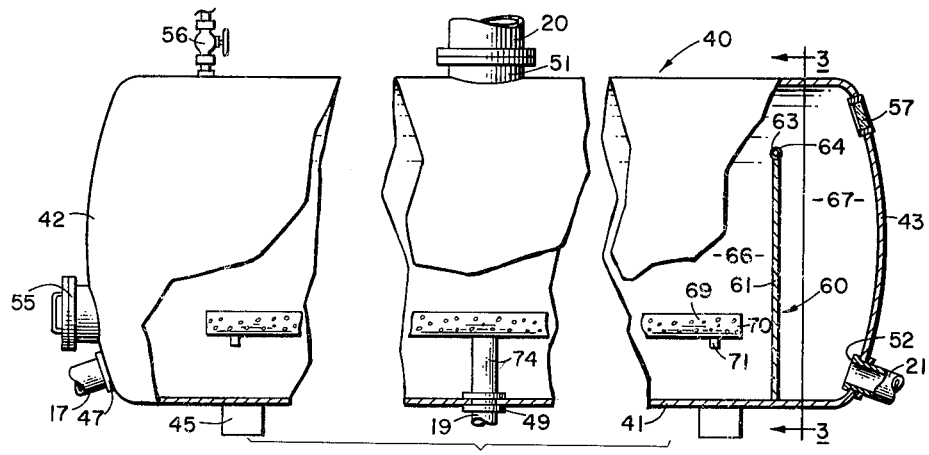
FIG. 2 is a part side elevation of and a part vertical section through the congealer; and, FIG. 3 is a cross-section through the congealer taken upon a plane indicated by line 3—3 on FIG. 2, and with parts cut away to better illustrate otherwise hidden parts.
Figure 3:
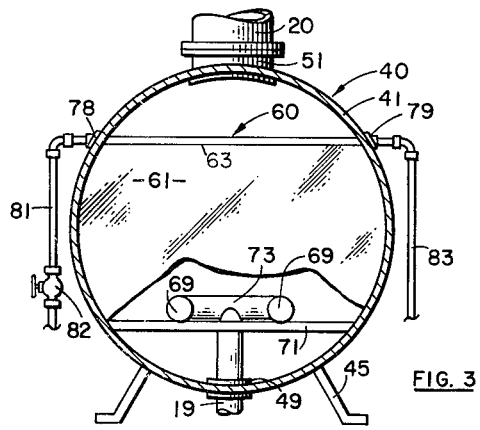

Returning now to the freezer 18 and referring to FIGS. 2 and 3 of the drawing for consideration of its details of construction and mode of operation as the same functions in a freeze process for demineralizing sea water, it comprises a tank 40, formed of a cylindrical side wall 41 (here of circular cross-section), an upstream end wall 42, and a downstream end wall 43. The tank is provided with a plurality of legs 45 for supporting the tank in a position of a longitudinal axis extending generally horizontally. The lower portion of the upstream end wall 42 has an inlet opening at 47 for connection by the pipe line 17. At the bottom of the tank is an opening at 49 for connection by the liquid butane inlet line 19. In the top of the tank is an adaptor 51 for connection to the butane vapor outlet duct 20. In the lower portion of the downstream end wall 43 there is an outlet opening 52 adapted for connection by the ice-brine slurry outlet pipe 21. The illustrated tank is equipped with conventional attachments such as manhole 55, a valve controlled relief vent 56 and a sight glass 57.

Proximate the downstream end wall 43 is a vertically extending weir designated generally by reference numeral 60 and formed of a transversely extending plate 61 secured as by welding at 62 around its periphery to the inside of the tank, and a horizontally extending tube 63 spaced from the inside of the top of the tank and defining the overflow edge or lip 64 of the weir. The weir thus divides the tank into a crystallization chamber 66 extending in an upstream direction from the weir, and a collection chamber 67 at the downstream side of the weir. In the lower part of the crystallization chamber are a plurality of injector tubes 69 having perforations 70 and supported by transversely extending rods 71. In the illustrated embodiment the injectors 69 are connected by a manifold 73 and a pipe leg 74 which extends upright from the liquid butane inlet opening 49 whereby the injectors discharge liquid butane directly into the sea water in the crystallization chamber and cause formation of ice crystals. The crystallization chamber 66 is longer in length than diameter, i.e., from about 3 to 5 times. The injectors 69 extend longitudinally in the crystallization chamber and provide for discharge of jets of liquid butane substantially throughout the length of the crystallization chamber thereby to continuously subject the sea water to bubbling butane as the sea water flows in the direction from the tank inlet end 42 to the weir 60. The ice crystals at the surface of the mother liquor in the crystallization chamber flow in a slurry or slushy ice-brine mixture over the lip of the weir and into the collection chamber 67 for withdrawal through the slurry outlet pipe 21.

By this invention tube 63 of the weir is connected in one of the cycles of the hydrocarbon heat exchange mediums, i.e., the octane cycle or the butane cycle, in a way such that the cooling of heat exchange medium in the weir tube will be recouped in the overall sea water conversion process. In the illustrated embodiment, warm oil from the storage tank 15 is pumped through the weir tube 63. The inlet end of the tube 63 for heat exchange fluid is designated by numeral 78 and its outlet end by numeral 79. The inlet end of the tube 63 is connected to a pipe line 81 controlled by a valve 82 and leading from the storage tank drawoff line 27. The outlet end of the weir tube is connected to a pipe line 83 leading to the pipe line 13 whereby the cooled octane is returned to the octane cycle for transfer of its refrigeration to the incoming sea water. The weir tube 63 is formed of a high heat conductive material, e.g., copper.

The overflow edge of the weir, being heated by the passage of warm octane through the weir tube 63, melts any ice crystals which would otherwise tend to adhere to the top edge of the weir and keeps the flow passage for slurry over the weir clear of crystal obstruction. Thus the ice crystals do not accumulate along the overflow edge of the weir, and the cleared passage over the weir prevents growth of chunks of ice crystals in the crystallization chamber.

While the invention has been described in connection with apparatus for sea water conversion in what is conceived to be the most practical and preferred embodiment therefore, it is to be understood that this description is illustrative only, not intended to limit the invention, and that the invention is to be accorded the full scope of the claims.

We claim:

1. A refrigeration process for conversion of a first aqueous solution to a more concentrated product solution and ice crystals which when melted produce a less concentrated product solution, the process comprising the steps of cooling said first solution in a crystallization zone to form ice crystals, flowing a slurry of said crystals in said more concentrated solution from said zone over a weir, separating said crystals from said more concentrated solution, and passing a hydrocarbon heat exchange liquid through a cycle of operations in the process, said cycle including the steps of warming said liquid in one of said operations by passing it in heat exchange relationship with said first solution, cooling said liquid in another of said operations by passing it in heat exchange relationship with one of said product solutions, diverting a portion of the warmed heat exchange liquid through the overflow lip of said weir to prevent accumulation of ice crystals at said lip, and passing the cooled heat exchange liquid from the lip in heat exchange relationship with said first solution in said one operation to assist in cooling said first solution.

2. A refrigeration congealer comprising a tank having a cylindrical side wall, an upstream end wall, and a downstream end wall, the longitudinal axis of the tank being substantially greater than its diameter, means for supporting the tank in a position of its longitudinal axis extending horizontally, a weir extending transversely in the tank and proximate said downstream end wall thereby dividing the inside of the tank into a crystallization chamber at the upstream side of the weir and a collection chamber at the downstream side of the weir, the weir having a horizontally extending tube defining the top edge of the weir spaced from the inside of the top of the tank, means for admitting liquid to be treated to the crystallization chamber, means for cooling liquid in the crystallization chamber to form crystals and residual liquor whereby a slurry of crystals and residual liquor will flow from the crystallization chamber over said tube into the collection chamber, means for withdrawing slurry from the collection chamber, and means for passing heated fluid through said tube to prevent adherence of crystals on said edge.

3. Refrigeration apparatus for conversion of a first aqueous solution to a more concentrated product solution and crystals which on melting are converted to a less concentrated product solution, the apparatus comprising a tank, a weir extending transversely in the tank thereby dividing the inside of the tank into a crystallization chamber at the upstream side of the weir and a collection chamber at the downstream side of the weir, the top edge of the weir being defined by a tube spaced from the inside of the top of the tank, means for admitting said first solution to said crystallization chamber, means for cooling the contents of the crystallization chamber to form said crystals whereby a slurry of crystals in said more concentrated solution will flow from the crystallization chamber over the top of the weir into the collection chamber, means for withdrawing slurry from the collection chamber, means for passing a hydrocarbon fluid through a cycle of operations comprising means for warming said fluid in one of said operations by passing it in heat exchange relationship with said first solution, means for passing a portion of the thus warmed fluid through said weir tube to prevent accumulation of crystals on the weir tube thereby cooling said fluid portion, and means for passing the cooled fluid portion in heat exchange relationship with said first solution in another of said operations to cool the said first solution.

4. Refrigeration apparatus for conversion of a first aqueous solution to a more concentrated product solution and ice crystals which on melting are converted to a less concentrated product solution, the apparatus comprising a tank, a weir extending transversely in the tank thereby dividing the inside of the tank into a crystallization chamber at the upstream side of the weir and a collection chamber at the downstream side of the weir, the top edge of the weir defined by a tube spaced from the inside of the top of the tank, means for admitting said first solution to said crystallization chamber, means for cooling the contents of the crystallization chamber to form ice crystals whereby a slurry of ice crystals in said more concentrated solutions will flow from the crystallization chamber over the top of the weir into the collection chamber, means for withdrawing slurry from the collection chamber, means for separating said crystals from said more concentrated solution, and a flow cycle for a hydrocarbon heat exchange liquid comprising means for passing said fluid in heat exchange relationship with said first solution to warm said fluid in one phase of the cycle, means for passing the warmed fluid in heat exchange relationship with one of said product solutions to cool said fluid in another phase of said cycle, means for diverting a portion of the warmed fluid through said weir tube to prevent accumulation of ice crystals on the weir tube thereby cooling said fluid portion, and means for passing the cooled fluid portion in heat exchange relationship with said first solution in said one phase to assist in cooling the said first solution.

References Cited by the Examiner
UNITED STATES PATENTS
| | | | |
|---|---|---|---|
| 2,344,922 | 3/44 | Raver | 62—346 |
| 3,098,733 | 7/63 | Rosenstein | 62—58 |

FOREIGN PATENTS
217,766 10/58 Australia.

NORMAN YUDKOFF, *Primary Examiner.*